US009578465B2

(12) United States Patent
Da Silva Neto et al.

(10) Patent No.: US 9,578,465 B2
(45) Date of Patent: Feb. 21, 2017

(54) AUTONOMOUS WIRELESS FIELD MONITOR

(71) Applicant: Endress + Hauser Process Solutions AG, Reinach (CH)

(72) Inventors: Eugenio Ferreira Da Silva Neto, Biel-Benken (CH); Jenish Gheewawla, Basel (CH)

(73) Assignee: Endress + Hauser Process Solutions AG, Reinach (CH)

( * ) Notice: Subject to any disclaimer, the term of this patent is extended or adjusted under 35 U.S.C. 154(b) by 589 days.

(21) Appl. No.: 14/058,378

(22) Filed: Oct. 21, 2013

(65) Prior Publication Data

US 2015/0112469 A1    Apr. 23, 2015

(51) Int. Cl.
*G05B 11/01* (2006.01)
*G06F 19/00* (2011.01)
*H04W 24/00* (2009.01)
*H04W 4/04* (2009.01)

(52) U.S. Cl.
CPC ...... *H04W 4/04* (2013.01); *G05B 2219/31131* (2013.01); *Y02P 90/14* (2015.11); *Y02P 90/18* (2015.11); *Y02P 90/20* (2015.11)

(58) Field of Classification Search
CPC ........... H04W 4/04; Y02P 90/14; Y02P 90/20; Y02P 90/18; G05B 2219/31131
USPC ... 455/456.1, 404.1, 404.2, 457, 67.11, 456; 700/12, 108
See application file for complete search history.

(56) References Cited

U.S. PATENT DOCUMENTS

| | | | |
|---|---|---|---|
| 2006/0015814 A1* | 1/2006 | Rappaport | H04L 41/145 715/733 |
| 2006/0172162 A1* | 8/2006 | Pearson | H01M 8/04089 429/431 |
| 2014/0022924 A1* | 1/2014 | Cili | H04W 24/08 370/252 |
| 2014/0282257 A1* | 9/2014 | Nixon | G05B 11/01 715/835 |
| 2015/0145954 A1* | 5/2015 | Pulleti | B64C 39/02 348/46 |

OTHER PUBLICATIONS

Swinglet CAM, website brochure, Apr. 2011, 6 pages.*

* cited by examiner

*Primary Examiner* — Robert Fennema
*Assistant Examiner* — Thomas Stevens
(74) *Attorney, Agent, or Firm* — Bacon & Thomas, PLLC

(57) ABSTRACT

A method for retrieving process, operation or maintenance relevant data of a process plant by way of a field monitor, wherein multiple wireless field device networks are present in the process plant. Data from the field devices from different field device networks are gathered by way of the field monitor. Plant information from the field devices belonging to different field device networks are displayed on a display of the field monitor to a user regardless of the respective field device network they belong to.

16 Claims, 3 Drawing Sheets

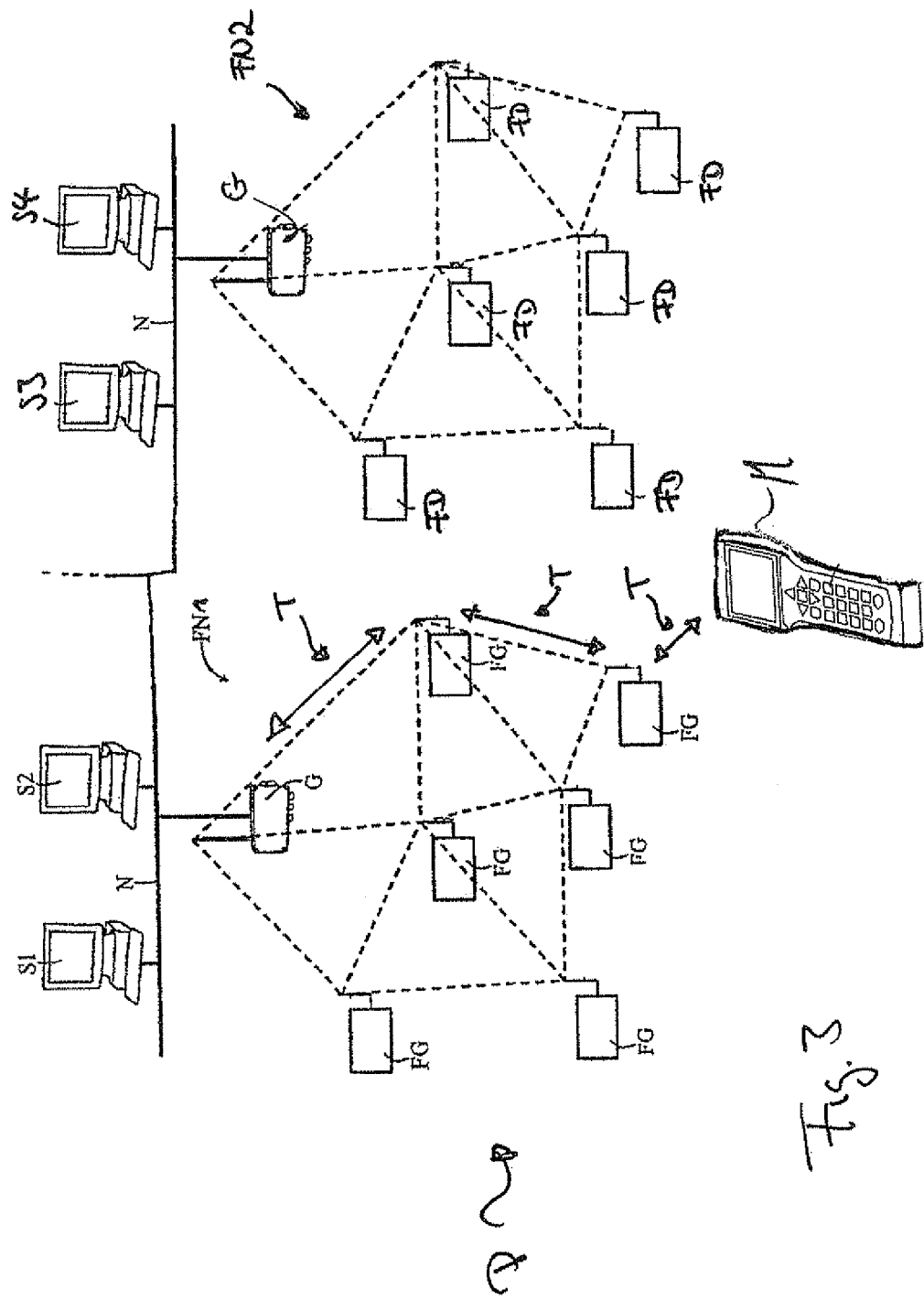

AUTONOMOUS WIRELESS FIELD MONITOR

TECHNICAL FIELD

The present invention relates to a method for retrieving engineering, process, operation or maintenance relevant data. The invention also relates to a method for servicing a wireless process plant and to a mobile field monitor.

BACKGROUND DISCUSSION

Different devices for servicing a process plant are known in the state of the art. For example the company Endress+Hauser proffers the so called FieldXpert—a handheld device which can be used to receive process information and the like.

When servicing a process plant and the equipment of the plant, which consists of field devices such as measurement devices, valves, gateways etc. information can be retrieved from the field devices by way of such a hand-held device. That is when service-personnel is in the vicinity of one or more field devices a wireless connection between the handheld and the field device can be established in order to exchange or receive data via a wireless interface of the field device and the handheld. This connection can, however, be established through a gateway or via an additional hardware interface.

Process control or data exchange in general can take place e.g. via a wired link between the field device. it is also known to use wireless communication which is set up between the field devices in order to allow data exchange. Wireless industrial networks such as WirelessHART, ISA-100 or ZigBee are well known in the state of the art.

However in larger process plants a multitude of wireless networks is present. Hence there are different wireless industrial networks available in one and the same place on the site of a process plant.

Hence it is a problem of the present invention to provide—especially to the service personnel—an easy and convenient way to retrieve engineering, process, operation or maintenance relevant data.

SUMMARY OF THE INVENTION

The problem is solved by a method for retrieving process, operation or maintenance relevant data of a process plant by way of a field monitor, by a method for servicing a wireless network in a process plant and by way of a field monitor.

Regarding the method for retrieving engineering, process, operation or maintenance relevant data of a process plant by way of a field monitor the problem is solved by way of a method for retrieving engineering, process, operation or maintenance relevant data of a process plant by way of a field monitor, wherein multiple wireless field device networks are present in the process plant, wherein data from field devices from different field device networks are gathered by way of the field monitor, regardless of the respective field device network they belong to.

The field monitor can e.g. work as participant of a respective wireless network, and can hence gather data from field devices from different field device networks, wherein e.g. by way of a wireless gateway the field monitor exchanges specific PDUs (Protocol Data Unit) with the gateway via a high speed communication channel, wherein PDUs contain engineering, process, operation or maintenance relevant data.

In an embodiment of the foresaid method plant information from the field devices belonging to different field device networks are displayed on a display of the mobile field monitor to a user.

The wireless field device network can e.g. be a wireless mesh network, like for example WirelessHART or ISA-100. The first and the second wireless field device network can be in different wireless networks and can have e.g. a different network name and/or network address and/or network mask.

In an embodiment of the method for retrieving engineering, process, operation or maintenance relevant data a broadcast is initiated on the different field device networks, preferably one by one in a sequential manner, e.g. via the network manager of the respective network, by way of the field monitor, by way of which broadcast diagnostic data is retrieved from the field devices, e.g. from wireless network nodes, and a procedure to service the field devices, especially independent of the network the field devices belong to, in the plant is determined.

In an embodiment of the method for retrieving process, operation or maintenance relevant data, firstly, a process plant model is utilized, e.g. a 2-D or 3-D model, and signal strengths of radio signals of field devices that are in range of the field monitor for wireless communication is determined, and secondly a distance calculator is used to determine a distance indication between the field monitor and the field devices being in range of the field monitor, which distance calculator makes use of the plant model identified and the determined signal strength of the radio signal of the individual field devices to calculate the respective distance indication.

In an embodiment of the method for retrieving engineering, process, operation or maintenance relevant data the process plant 2-D or 3-D model is enhanced with location information of one or more of the field devices, and the process plant model includes information about the size and/or physical properties of physical objects in the process plant.

In an embodiment of the method for retrieving engineering, process, operation or maintenance relevant data the field monitor joins the different wireless networks at least at e.g. schedules times, e.g. at several predetermined time intervals, in order to retrieve information from the field devices in the different wireless networks.

In an embodiment of the method for retrieving engineering, process, operation or maintenance relevant data only field devices that fulfill a predetermined property, examples thereof being a signal strength, a diagnostic state, such as a diagnostic state of the of field device's battery, have a specific network identity, device type or are inside a certain geo fencing sector etc. are displayed on the field monitor display and/or considered when determining a procedure to service the field devices.

In an embodiment of the method for engineering, retrieving process, operation or maintenance relevant data a route is displayed on a display of the field monitor in accordance with a maintenance plan scheduled for the field devices and/or servicing issue within the process plant, wherein the route provides an, preferably optimal, order in which the field devices are to be maintained or serviced also according to criticality of field devices diagnostics.

Regarding the method for servicing a wireless network in a process plant the problem is solved by a method for servicing a wireless network in a process plant wherein the field monitor serves as a repeater for repeating radio signals from a first field device to a second field device, e.g. if both field devices belong to the same network.

In an embodiment of the method for servicing a wireless network in a process plant the strength of the radio signals between the mobile field monitor and the first field device and the strength of the radio signals between the mobile field monitor and the second field device are determined, and these signals' strengths and/or location information, e.g. based on a positioning system built-in the field monitor, and/or spatial orientation, e.g. based on a gyroscope built-in the field monitor, are used to determine a position for either a location of an antenna of the first and/or second field device or a location for a permanent gateway or repeater of radio signals between the first and the second field device in the specific wireless network of interest.

Regarding the field monitor the problem is solved by a field monitor that is able to carry out the method as described in one of the preceding embodiments.

In an embodiment of the autonomous field monitor the field monitor is incorporated in a mobile autonomous vehicle, e.g. a flying drone.

In an embodiment of the field monitor the mobile autonomous vehicle through a typical aerial survey monitors the, preferably wireless signals, field devices' diagnostic parameters, especially status messages, warning events, battery level and gathers geo-tagged images of installed base and/or position coordinates of field devices and gateways respectively.

In an embodiment of the field monitor the mobile autonomous vehicle is designed to capture images and/or terrain information in order to identify a layout for a wireless network and/or in order to position wireless network components respectively.

In an embodiment of the field monitor the information gathered by the mobile autonomous vehicle can be retrieved, e.g. during or after an aerial survey of the mobile autonomous vehicle, via another field monitor, a handheld terminal, a computer and/or a similar device.

The invention is described in detail in the following drawings:

BRIEF DESCRIPTION OF THE DRAWINGS

FIG. 3 shows: a schematic representation of a process plant with two wireless networks and a field monitor in form of a handheld device, wherein additionally a communication connection between the field monitor and a gateway is depicted.

DETAILED DISCUSSION IN CONJUNCTION WITH THE DRAWINGS

Figure 1:
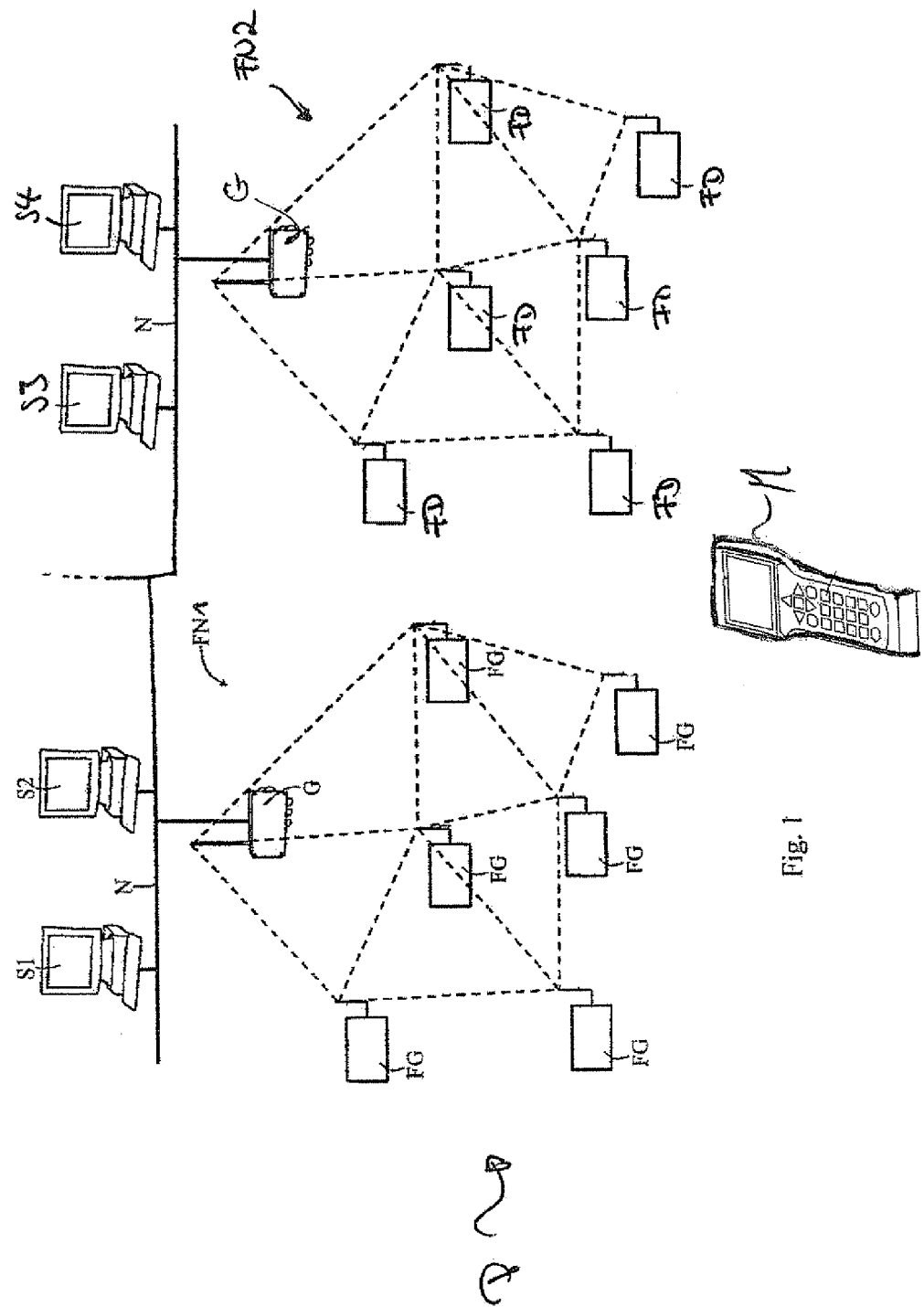
FIG. 1 shows: a schematic representation of a process plant with two wireless networks and a field monitor in form of a handheld device.

FIG. 1 shows a process plant P having a multitude of field devices FG, FD.

Figure 2:
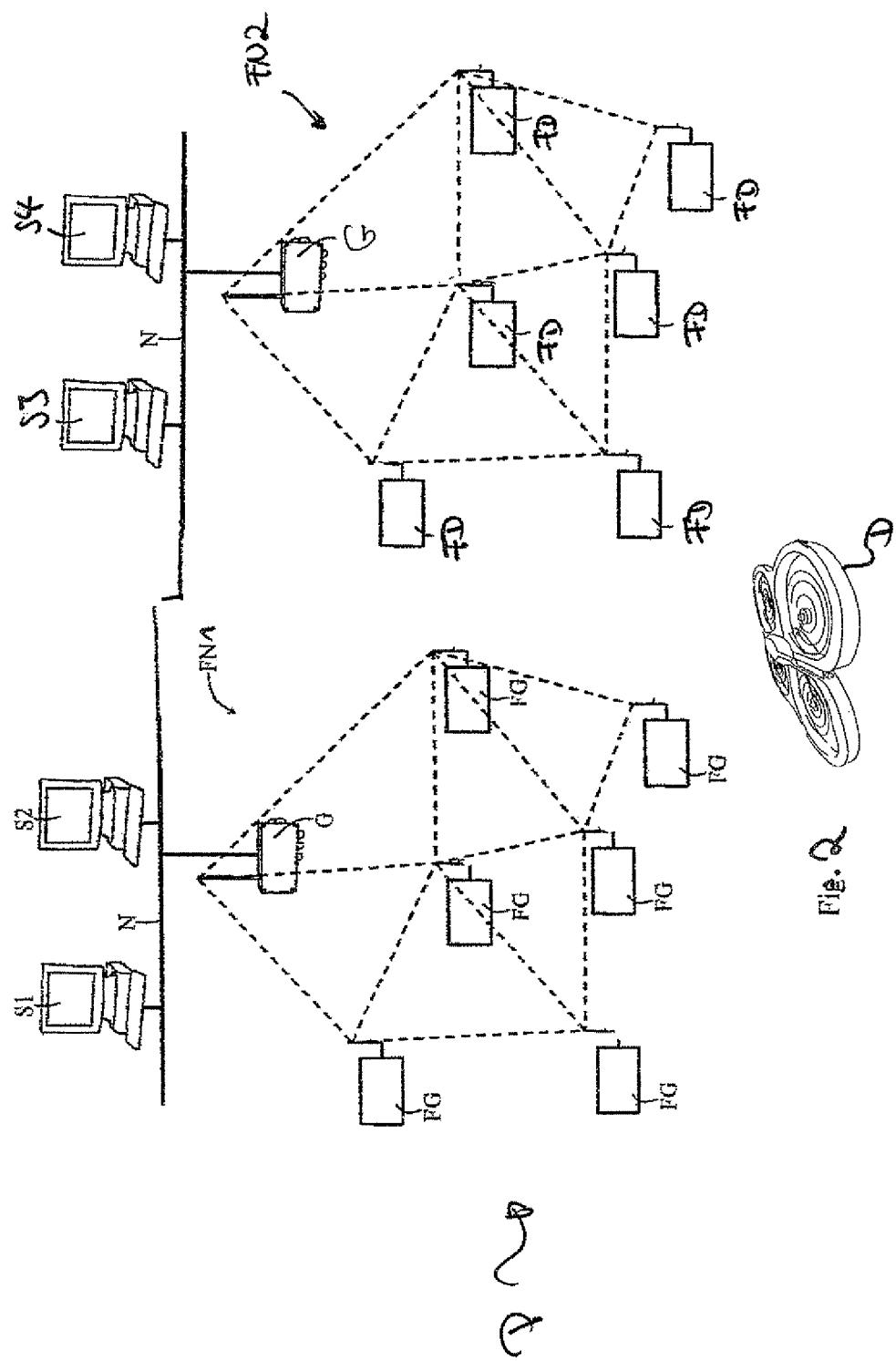
FIG. 2 shows: a schematic representation of a process plant with two wireless networks and a field monitor in form of a drone.

As an example the process plant P in FIG. 1 shows two wireless networks FN1, FN2 but of course more than two wireless field device networks can be present. The field device network FN1 as well as the field device network FN2 can be a WirelessHART network. The protocol or physical layer of the field device network FN1 can be different than the one of the field device network FN2, e.g. a ZigBee network. The network preferably is a mesh network as shown in FIG. 1 and FIG. 2.

Preferably in servicing such a process plant P service personnel carry out their servicing duties as quickly as possible. This requires for example the provision of a route through the plant, which has the shortest possible length and/or optimized path.

Such a route is often one that not only considers field devices FG of the first network FN1, in particular those that are in range of a field monitor, which could be a handheld device for servicing field devices, that the service personnel utilize, but also field devices FD that are part of the second field device network FN2.

Indeed a situation could occur nowadays where the service personnel is close to two field devices FG, FD, i.e. in range for wireless communication, but the field devices FG, FD belong to different wireless networks FN1, FN2. Hence service personnel would either have to switch the wireless network manually from FN1 to FN2 or would assume a failure e.g. in the communication interface of the field device not detected.

Hence according to the invention field devices FG, FD of different wireless field device networks FN1, FN2 are displayed to a user on the field monitor M.

This is for example done by joining the different wireless networks FN1, FN2 alternately. When joining one of the networks FN1, FN2 information regarding the field devices FG, FD in that network can be retrieved by the field monitor M. The information gathered can then be displayed on a display of the field monitor M to the service personnel. For this purpose a joining routine can be used which enables the field monitor M to join the field device networks FN1, FN2 present at predefined times.

To retrieve the required information a broadcast can be transmitted in the respective wireless network FN1, FN2. This broadcast can be initiated by the field monitor M.

In order to display the required information, a 2-D or 3-D model of the process plant depicting the geometric shape of the equipment, and the size of a tank etc., in the process plant P can be utilized. To arrange the field devices FG, FD on the display this model and the signal strength of the radio signals of the field devices FG, FD that are in range can be used to display the field devices FG, FD on the display of the field monitor M. Such a display indicates to the service personnel the position and the distance of the nearby field devices—regardless of the field device network FN1, FN2 the field devices FG, FD belong to. However additional information indicating the field device network FN1, FN2 the respective field device FG, FD being in range can also be displayed.

The field monitor M can also be capable of serving as a repeater in one of the field device networks FN1, FN2. This can be used to position field devices FG, FD wherever possible or at least change an antenna's orientation in the field device network FN1, FN2 for optimal reception of radio signals.

The field monitor M can also serve as a bridge between two different field device networks FN1, FN2 and thereby permitting a direct communication or information transfer between the different field device networks FN1, FN2 or field devices FG, FD in those different networks FN1, FN2.

Instead of a hand held field monitor M for use by service personnel a mobile autonomous vehicle can be used to gather information about and/or from field devices FG, FD or plant physical structure as describe above. The mobile autonomous vehicle can, e.g. be a flying drone D. Such drones D are well known in the state of the art. Such a drone D can be used to identify or to produce a 2D- or 3D-model of the process plant P.

Such a drone D can also be used to collect diagnostic data, such as diagnostic parameters as battery level etc. from field devices FG, FD in the process plant P. Especially maintenance tasks or duties such as configuration and asset monitoring can be assigned to such a drone D.

Additionally such a drone D which serves as a field monitor M can be used to measure the radio signal strength throughout a process plant P or at a certain place or area in the process plant to optimize the wireless field device network FN1, FN2 or to determine the radio signal strength at a place or area where a new field device is to be installed and/or integrated into a wireless field device network FN1, FN2. Based on such data the optimal position of an antenna or field device can be determined and hence the performance of the wireless field device network FN1, FN2 optimized. For this purpose the drone D can be either autonomous or manually controlled.

Of course for such purposes a camera and/or a wireless communication interface modules including dedicated proprietary firmware are integrated in the field monitor M or the drone D respectively.

The wireless field device networks FN1, FN2 as shown in FIG. 1 and FIG. 2 can be connected via a gateway G to a supervision, control or HMI unit S1, S2, S3, S4 and/or a process logic control. Alternatively the wireless networks FN1, FN2 can be stand-alone networks. The supervision, control or HMI units can themselves be connected by a wired network N to exchange data in between them and/or the field devices.

FIG. 3 shows a schematic representation of a process plant, wherein additionally a communication connection between the field monitor and a gateway is depicted.

The field monitor M joins the network FN1 as shown in FIG. 1 and gets assigned as a node in the respective network. Additionally the field monitor announces himself as a field monitor to the gateway of the network FN1.

Subsequently a tunnel, preferably a communication connection with e.g. a higher speed than the ordinary connection in the wireless network FN1, is established between the gateway G and the field monitor M. Via this connection T, which serves as a tunnel between the gateway G and the field monitor M specific PDUs (Protocol Data Unit) can be exchanged. These PDUs can be transferred e.g. via telegrams between the gateway and the field monitor. The PDUs can contain engineering, process, operation or maintenance relevant data.

Thus engineering, process, operation or maintenance relevant data are collected by the gateway and only transferred to the field monitor when the field monitor connects itself to the wireless network, in this case FN1. Accordingly the time necessary to gather the above mentioned information is reduced since it is not the field monitor M itself which has to initiate such a request to each and every participant in the network but has only to receive such information from the gateway.

The invention claimed is:

1. A method for retrieving engineering, process, operation or maintenance relevant data of a process plant by way of a field monitor, comprising the steps of:
providing multiple wireless field device networks in the process plant; and
gathering data from field devices from different ones of the multiple wireless field device networks by way of the field monitor regardless of the multiple wireless field device network they belong to, wherein:
firstly, a 2-D or 3-D process plant model is utilized and a signal strength of radio signals of field devices being in range for wireless communication of the field monitor is determined; and
secondly, a distance calculator is used to determine a distance indication between the field monitor and the field devices being in range of the field monitor, which distance calculator makes use of the plant model identified and of a determined signal strength of the radio signal of individual field devices to calculate a respective distance indication.

2. The method according to claim 1, wherein:
plant information from the field devices belonging to different field device networks are displayed on a display of the field monitor to a user regardless of a respective field device network they belong to.

3. The method according to claim 2, wherein:
a communication is initiated by the field monitor on the different field device networks, preferably one by one in a sequential manner, via a network manager, between the field monitor and a Gateway of the respective network, by way of a gateway initiates a broadcast requesting diagnostic information from every field devices of a specific network, which broadcast diagnostic data is retrieved by a Gateway from the field devices, from wireless network nodes, which generates specific Protocol Data Units to be transmitted to the field monitor via high speed communication channel; and
a Protocol Data Unit contains engineering, process, operation or maintenance relevant data, and a procedure to service the field devices, independent of the network the field devices belong to, in the plant is determined.

4. The method according the claim 1, wherein:
the process plant 2-D or 3-D model is enhanced with location information, of one or more of the field devices; and
the process plant model includes information about size and/or physical properties of physical objects in the process plant.

5. The method according to claim 4 wherein:
the location information is GPS coordinates.

6. The method according to claim 1, wherein:
the field monitor at least at, several predetermined interval times, joins the different wireless networks in order to retrieve information from the field devices in the different wireless networks.

7. The method according to claim 1, wherein:
only field devices that fulfill a predetermined property, a signal strength, a diagnostic state, of the of field device's battery, have a specific network identity, or are inside a certain geo fencing sector or specific location etc. are displayed on a field monitor display and/or considered when determining a procedure to service the field devices.

8. The method according to claim 1, wherein:
a route is displayed on a display of the field monitor in accordance with a maintenance plan scheduled for the field devices and/or in accordance with a criticality of a servicing issue within the process plant;
by the route the, preferably optimal, order in which the field devices are to be maintained or serviced is provided.

9. A field monitor to carry out the method as described in claim 1.

10. The field monitor according to claim 9, wherein:
the field monitor is built-in a mobile autonomous vehicle.

11. The field monitor according to claim 10, wherein:
the mobile autonomous vehicle monitors the, preferably wireless, field devices' diagnostic parameters, especially status messages, warning events, battery level, geo-tagged images and/or position coordinates respectively.

12. The field monitor according to claim 10, wherein:
the mobile autonomous vehicle is a flying drone.

13. The field monitor according to claim 9, wherein:
the mobile autonomous vehicle is designed to capture images and/or terrain information in order to identify a layout for a wireless network and/or position wireless network components respectively.

14. The field monitor according to claim 9, wherein:
information gathered by the mobile autonomous vehicle can be retrieved, during or after a tour of the mobile autonomous vehicle, via another field monitor, a handheld terminal, a computer or similar device.

15. A method for servicing a wireless network in a process plant, comprising the steps of:
providing multiple wireless field device networks in the process plant;
gathering data from field devices from different field device networks by way of a field monitor regardless of the multiple wireless field device network they belong to; and
the field monitor serves as a repeater for repeating radio signals from a first field device to a second field device.

16. The method for servicing a wireless network in a process plant according to claim 15, wherein:
strength of the radio signals between a mobile field monitor and the first field device and the strength of the radio signals between the mobile field monitor and the second field device is determined; and
these signals' strengths and/or location information, based on a positioning system built-in the field monitor, and/or spatial orientation, based on a gyroscope built-in the field monitor, are used to determine a position for either a location of an antenna of the first and/or second field device or a location for a permanent repeater of radio signals between the first and the second field device.

* * * * *